Patented Dec. 20, 1949

2,491,811

UNITED STATES PATENT OFFICE 2,491,811

COMPOSITIONS OF MATTER FROM OIL-MODIFIED ALKYD RESINS

Philip W. Ham, Schenectady, N. Y., assignor to General Electric Company, a corporation of New York No Drawing. Application April 30, 1946, Serial No. 666,201

10 Claims. (Cl. 260—16)

This invention is concerned with new liquid compositions especially suitable for use in coating, impregnating, adhesive, and other applications. Particularly, the invention relates to a liquid coating composition comprising (1) ethyl cellulose, (2) an oil-modified tetrachlorophthalate alkyd resin compatible with the ethyl cellulose, and (3) a suitable solvent for (1) and (2). More specifically, the invention is concerned with a liquid coating composition comprising (1) ethyl cellulose and (2) the product of reaction, preferably under heat, of a mixture comprising (a) a modifying oil, (b) a polyhydric alcohol, and (c) a compound selected from the class consisting of tetrachlorophthalic anhydride and tetrachlorophthalic acid, and (3) a suitable solvent more advantageously a suitable volatile solvent, for (1) and (2).

For many years, nitrocellulose has been employed with oil-modified phthalic anhydride alkyd resins (containing no tetrachlorophthalic acid or anhydride) in varying proportions to form compositions which can be dissolved in volatile solvent media to yield materials having extensive use as clear dyed or pigmented coating compositions for metal, wood, or other surfaces. Nitrocellulose, when used with these oil-modified phthalic acid or anhydride alkyd resins, is compatible with these alkyd resins as is shown by the clear films which are deposited from a coating solution containing the nitrocellulose and the oil-modified alkyd resin. In addition, the nitrocellulose accelerates the drying of the coating composition and lends toughness to the dried film.

However, nitrocellulose has many disadvantages inherent in the material itself, among these being its extreme inflammability, poor heat stability, inferior resistance to discoloration by light, etc. Many attempts have been made to substitute ethyl cellulose for the nitrocellulose in the aforementioned coating compositions since ethyl cellulose has the desirable properties of the nitrocellulose without its disadvantages. In addition, ethyl cellulose is soluble in more available solvents than nitrocellulose. To my knowledge, attempts to effect this substitution have been unsuccessful since ethyl cellulose is incompatible with the usual oil-modified phthalic anhydride alkyd resins. This fact is evident when ethyl cellulose is mixed with an oil-modified alkyd resin in a suitable volatile solvent and a film of this solution is deposited on a glass surface and allowed to air-dry; the film in this case is cloudy, hazy, and low in gloss. When pigments are incorporated in the coating composition, the deposited films from this coating composition are dull and flat. Moreover, the coating composition itself lacks homogeneity, is cloudy and turbid.

I have now discovered that ethyl cellulose may be used in place of nitrocellulose with oil-modified alkyd resins to yield compatible mixtures if, in the preparation of the oil-modified alkyd resin, tetrachlorophthalic acid or anhydride is one of the polycarboxylic acids used in preparing the resin. By means of my invention, I am able to obtain compatible, clear coating compositions or glossy, smooth, pigmented coating compositions even when the amount of the oil-modified alkyd resin is as high as approximately eighteen or twenty times the amount, by weight, of the ethyl cellulose.

The usual available forms of ethyl cellulose may be employed in the practice of my invention. I prefer to use one in which the ethoxyl content ranges from about 46.8 to 49.5 per cent, although ethoxyl contents as low as 43.5 per cent are not precluded. The viscosity of an ethyl cellulose containing the above ethoxyl range (46.8 to 49.5 per cent) as determined at 25° C. on a 5 per cent concentration in a solvent composed of 80 parts toluene and 20 parts denatured alcohol (by weight) may vary within wide limits, suitable viscosities having been found to range from 7 to 100 centipoises. The amount of ethyl cellulose used with the oil-modified alkyd resin in preparing the claimed coating compositions may be varied over a wide range. Depending upon the particular purpose for which the compositions are to be used, the percentage proportions, by weight, of the ethyl cellulose and the oil-modified alkyd resin generally are within the range of 5 to 95 per cent of the ethyl cellulose to 95 to 5 per cent of the oil-modified alkyd resin, the preferable range being from 40 to 90 percent of the former to 60 to 10 per cent of the latter.

The term "modified alkyd resin," as used herein and in the appended claims, is intended to mean the resinous condensation product resulting from the reaction of one or more polyhydric alcohols with tetrachlorophthalic acid or anhydride and one or more of the usual oily modifying ingredients ordinarily employed in the preparation of modified alkyd resins, the said modifying ingredients being selected from the class consisting of non-drying oils, semi-drying oils, drying oils, fatty oils, fatty oil acids, and mixtures thereof, all the foregoing being derived, for example, either from vegetable or animal sources, or produced synthetically, etc.

It is to be understood that part of the tetrachlorophthalic acid or anhydride may be replaced with other polybasic acids, more particularly polycarboxylic (dicarboxylic, tricarboxylic, etc.) acids, and specifically saturated aliphatic or aromatic polycarboxylic acids, I prefer to use a dicarboxylic acid. Thus I may advantageously replace from about 2 per cent to about 50 per cent, by weight, preferably from about 5 to 40 percent, of the tetrachlorophthalic acid or anhydride with one or more other non-halogenated polycarboxylic acids or anhydrides, for example, phthalic acid or anhydride, to obtain the desired compatibility. Otherwise stated, a substantial amount of tetrachlorophthalic acid or anhydride may be present in the liquid coating composition corresponding to from about 50 to 98 per cent, by weight, of the amount of the non-halogenated polycarboxylic acid or anhydride used. Examples of such polycarboxylic acids are: oxalic, malonic, succinic, glutaric, adipic, suberic, tricarballylic, non-halogenated phthalic acids or anhydrides, e. g., phthalic, isophthalic acid, terephthalic acid, benzophenone - 2,4' - dicarboxylic, diphenic, naphthalic, etc., acids. The anhydrides of these materials, when obtainable, may also be used. The amount of the modifying oil or ingredient may likewise be varied, e. g., from about 5 per cent to 70 per cent, preferably from 10 to 60 per cent, by weight, of the total weight of the modifying oil, the polyhydric alcohol and the polybasic acid or acids (or anhydride, if it is used) present in the reaction mixture, including the tetrachlorophthalic acid or anhydride.

Examples of polyhydric alcohols (dihydric, trihydric, etc.) which may be used in this invention are ethylene glycol, diethylene glycol, propylene glycol, dipropylene glycol, trimethylene glycol, glycerine, pentaerythritol, sorbitol, mannitol, etc. Monohydric alcohols, e. g., those boiling above 150° C., such as the alkyl ethers of diethylene glycol, e. g., methyl ether of diethylene glycol, etc., ether of ethylene glycol, e. g., butyl Cellosolve, etc., may also be used to modify the properties of the oil-modified alkyd resin.

Among the modifying oils (in the raw, heated or blown state) which may be used in the preparation of the oil-modified alkyd resin are linseed oil, rapeseed, cotton seed, chinawood oil, castor oil (including raw castor oil), dehydrated castor oil, soya bean oil, perilla oil, oiticica oil, linseed oil acids, coconut oil fatty acids, ricinoleic acid (including dehydroxylated ricinoleic oil acids), fatty acid glycerides, e. g., the glycerides of linoleic and linolenic acids, palmitic acid, oleic acid, stearic acid, babassu oil, palm oil, fish oils and fish oil acids as clupanodonic, and fatty acids derived therefrom, etc. Various pigments or pigment dispersions may be added to these novel coating compositions which can be used in preparing opaque films of high gloss and lustre.

In carrying the invention into effect, an oil-modified alkyd resin is first prepared in accordance with the technique now well known in the alkyd resin art. For example, this may comprise heating a mixture containing the polyhydric alcohol, the tetrachlorophthalic acid or anhydride and the modifying oil at an elevated temperature of the order of from 150 to 250° C. for from about 2 to 12 hours, or even longer, until the desired acid number of the reaction mass is obtained. The acid number of the finally reacted mass is preferably below 50, optimum results being obtained when the acid number is from about 4 to 10 or 20. Although equimolecular proportions of the polyhydric alcohol and the polycarboxylic acid or anhydride (including the tetrachlorophthalic acid or anhydride) may be used in making the oil-modified alkyd resin, I prefer to use at least slight excess of the polyhydric alcohol in order to cause the reaction to go more fully to completion. It will be understood, of course, by those skilled in the art that proportions other than approximately equimolecular quantities may be employed. For example, a larger molecular excess of the polyhydric alcohol may be used, if desired, in order to obtain an alkyd resin of lower acid value.

The ethyl cellulose may then be dissolved in a suitable solvent or mixture of suitable solvents and then blended with a solution of the oil-modified alkyd resin described above. Alternatively, a coating composition may be prepared by dissolving the ethyl cellulose and the oil-modified alkyd resin in a suitable solvent or mixture of suitable solvents and applying this solution to the particular surface desired to be coated. In order that those skilled in the art better may understand how the present invention may be practiced, the following illustrative examples thereof are given. All parts are by weight.

The ethyl cellulose used in the following examples, unless stated otherwise, was one having an ethoxyl content of approximately 48.5 to 49.5 per cent, 10 cps. The ethyl cellulose was employed as a solution consisting of the following ingredients:

| | Parts by weight |
|---|---|
| Ethyl cellulose | 200 |
| Commercial xylol | 640 |
| Normal butyl alcohol | 160 |

The oil-modified alkyd resin (containing no tetrachlorophthalic anhydride) employed in Example 1 was prepared as follows:

*Resin A*

| | Parts | Approx. Mol Ratio |
|---|---|---|
| Glycerine | 300 | 1.2 |
| Phthalic anhydride | 410 | 1.0 |
| Coconut oil fatty acids | 290 | |

The above ingredients were heated together under a nitrogen atmosphere in a kettle equipped with a stirrer and thermometer. The mass was heated for about one hour at a temperature of approximately 180° C. and thereafter the temperature was raised gradually over a period of about 6 hours to a temperature of the order of 230° C. until an acid number of approximately 5 was obtained. The molten mass was dissolved in xylene to the desired solids content.

The oil-modified alkyd resin employed in Example 2 was prepared as follows:

Resin B

|  | Parts | Approx. Mol Ratio |
|---|---|---|
| Glycerine | 190 | 1.2 |
| Tetrachlorophthalic anhydride | 510 | 1.0 |
| Coconut oil fatty acids | 300 | |

The ingredients were placed in a kettle equipped with an electrical stirrer, a thermostatically controlled heating unit and an inlet for gas. The reaction mass was heated under a nitrogen atmosphere at a temperature of about 190–196° C. for about 3 hours. Thereafter the temperature was raised to 226° C. and held there for about forty-five minutes. The acid number of the reaction mass was about 4.1. This resin was dissolved in xylol to the desired solids content.

Example 3 employed an oil-modified alkyd resin prepared as follows:

Resin C

|  | Parts | Approx. Mol Ratio |
|---|---|---|
| Glycerine | 176 | 0.9 |
| Tetrachlorophthalic anhydride | 624 | 1.0 |
| Coconut oil fatty acids | 200 | |

Using the same equipment as employed to make Resin B, the above reactants were heated for about 6 hours at a temperature of approximately 196–200° C. while nitrogen gas was introduced into the kettle to provide a nitrogen atmosphere over the reaction mass. The resin (acid number of 23), was then dissolved in xylol to the desired solids content.

Unless stated otherwise, the oil-modified alkyd resin (tetrachlorophthalic anhydride modified) employed in the remainder of the examples was prepared by the following procedure:

Resin D

|  | Parts | Approx. Mol Ratio |
|---|---|---|
| Tetrachlorophthalic anhydride | 600 | 1.0 |
| Glycerine | 200 | 1.1 |
| Linseed fatty acids (of linseed oil) | 200 | |

The foregoing materials were heated, while stirring, under a nitrogen atmosphere for about 10 hours at a temperature of about 190–210° C. After this period of time the acid number of the mass was about 10. The hot resin was dissolved in toluene or xylene depending upon the example for which the resin was intended.

EXAMPLE 1

One hundred parts of the ethyl cellulose solution (supra) was thoroughly mixed with 11.7 parts of a 60 per cent xylol solution of Resin A. This mixture was used as a coating composition by spreading it on a glass slide with a doctor blade. The coated glass slide was air-dried for about one-half hour to yield a dull, cloudy film, indicating that the ethyl cellulose was incompatible with the oil-modified alkyd resin. It is to be noted that the mixture used as the coating composition was originally cloudy and turbid.

EXAMPLE 2

In this example, one hundred parts of the aforementioned ethyl cellulose solution was mixed thoroughly with ten parts of a 70 per cent xylol solution of Resin B to form a clear solution. When this coating composition was applied to a glass plate with a doctor blade and air-dried for one-half hour, a clear, hard, glossy, homogeneous film having good adhesion was obtained.

EXAMPLE 3

One hundred parts of the ethyl cellulose solution disclosed above was thoroughly mixed with 10.75 parts of a 65 per cent xylol solution of Resin C to yield a clear coating composition. When this coating composition was applied to a glass plate with a doctor blade and allowed to dry in the air for one-half hour, a clear, homogeneous film was obtained as in the case of Example 2.

EXAMPLE 4

A coating solution was prepared by mixing the following ingredients together:

|  | Parts |
|---|---|
| Dipentene | 560 |
| Normal butyl alcohol | 36 |
| Pine oil | 36 |
| Ethyl cellulose (48.5–49.5 per cent ethoxyl content, 10 cps.) | 134 |
| Tricresyl phosphate | 27 |
| 65 per cent xylene solution of Resin D | 207 |

The coating solution was applied to a glass slide with a doctor blade and allowed to air-dry for one-half hour. A hard, clear, glossy film was obtained which exhibited flame-resistant properties.

EXAMPLE 5

An oil-modified alkyd resin was prepared as follows:

Resin E

|  | Parts | Approx. Mol Ratio |
|---|---|---|
| "Red oil" acids (oleic acid) | 300 | |
| Glycerine | 264 | 1.0 |
| Tetrachlorophthalic anhydride | 936 | 1.1 |

The above ingredients were mixed together and heated, while stirring, at a temperature of 192–226° C. for about 8 hours until an acid number of approximately 6 was obtained. While still in a molten state, the resinous mass was dissolved to 65 per cent solids content in xylene. Of this solution, about 385 parts was mixed with 1000 parts of a 25 per cent solution of ethyl cellulose (48.5–49.5% ethoxyl content) in a solvent comprising the following formulation:

|  | Parts |
|---|---|
| Aromatic petroleum solvent | 500 |
| Petroleum naphtha | 300 |
| Normal butyl alcohol | 100 |
| Ethyl alcohol | 100 |

Using this mixture of liquids as a coating composition, a thin film was deposited on a glass plate with a doctor blade and allowed to air-dry for about one-half hour to yield a clear, hard, smooth, glossy film. This example illustrates the effect of using higher proportions of the oil-modified alkyd resin with ethyl cellulose.

EXAMPLE 6

This example illustrates the manner in which part of the tetrachlorophthalic anhydride may be substituted by another polycarboxylic acid, specifically phthalic anhydride.

Resin F-1

| | Parts | Approx. Mol Ratio |
|---|---|---|
| Castor Oil (raw) | 512 | |
| Glycerine | 268 | 3.6 |
| Tetrachlorophthalic anhydride | 680 | 3.1 |
| Phthalic anhydride | 115 | 1.0 |

The oil, glycerine, phthalic anhydride and one-third of the tetrachlorophthalic anhydride were mixed in a 4-necked glass flask equipped with a power stirrer, nitrogen gas inlet, thermocouple, air-cooled condenser, and an electric glass-blanket, thermostatically controlled heater. The reaction mixture was heated in the above apparatus for about 30 minutes at a temperature of approximately 150° C., after which time the second one-third portion of the tetrachlorophthalic anhydride was added. Fifteen minutes later, the balance of the tetrachlorophthalic anhydride was added and the reaction mixture was heated for an additional thirty-five minutes. The temperature was then raised to 200° C. and the heating continued for about 10½ hours while a nitrogen gas atmosphere was maintained over the reaction mass. When the acid number was about 15, the mass was cooled somewhat and dissolved in toluene to a 70 per cent solids content.

The above solution was mixed in varying proportions with an ethyl cellulose solution comprising the following ingredients:

| | Parts |
|---|---|
| Ethyl cellulose (48.5–49.5 per cent ethoxyl content 10 cps.) | 250 |
| Xylene | 330 |
| "Straight petroleum distillate," 80°–130° C. range | 233 |
| Ethyl alcohol | 113 |
| n-Butyl alcohol | 75 |

The coating compositions prepared from the above resin and ethyl cellulose solutions had the following formulations:

| Coating Comp. Number | Parts Ethyl Cellulose Solution | Parts Resin F-1 Solution |
|---|---|---|
| 6A | 400 | 143 |
| 6B | 400 | 286 |
| 6C [1] | 314 | 286 |

[1] This coating solution, in addition to the ingredients disclosed above, also contained 268 parts of a yellow pigment paste, and about 200 parts of the thinner used in making the ethyl cellulose solution Coating compositions 6A, 6B, and 6C were applied to glass plates with a 6-mil doctor blade and allowed to air-dry for about one-half hour. Clear, hard, homogeneous films were obtained in the case of coating compositions 6A and 6B, while 6C gave a hard, opaque, glossy, smooth film.

Resin F-2

| | Parts | Approx. Mol Ratio |
|---|---|---|
| Castor oil (raw) | 780 | |
| Glycerine | 366 | 2 |
| Tetrachlorophthalic anhydride | 566 | 1 |
| Phthalic anhydride | 288 | 1 |

The above ingredients were reacted in a similar manner and in the same apparatus as in the preparation of Resin F-1 (supra). The resinous reaction product was dissolved in toluene to a 70 per cent solids content. Liquid coating compositions were made having the following compositions:

| Sample No. | Parts Resin F-2 Solution | Parts Ethyl Cellulose Solution |
|---|---|---|
| 6D | 143 | [1] 400 |
| 6E | 286 | [1] 400 |
| 6F | 200 | [2] 480 |
| 6G | 200 | [3] 250 |
| 6H | 200 | [4] 600 |

[1] The ethyl cellulose solution in these samples was the same as that used in making the coating compositions for samples 6A to 6C

[2] This sample used the same ethyl cellulose solution as in samples 6D and 6E, and, in addition, employed 250 parts of a yellow pigment paste, and 70 parts of the thinner solution used to prepare the ethyl cellulose solution.

[3] The ethyl cellulose solution employed in this sample comprised the following:

| | Parts |
|---|---|
| Ethyl cellulose (44.5% ethoxyl content, 21 cp. viscosity) | 2000 |
| Toluene | 5600 |
| Ethyl alcohol | 1400 |

[4] The ethyl cellulose solution was the same as used in sample 6G with the additional ingredient of 200 parts of the yellow pigment paste.

The above liquid coating compositions were applied to glass plates with a doctor blade and allowed to air-dry for one-half hour. The films containing no pigment were clear, tough and homogeneous after this period, while the films containing the pigment were smooth, tough, and had a high gloss. In every instance, where no pigment was employed, the coating compositions per se were clear and transparent.

EXAMPLE 7

Coating compositions were prepared employing the following ingredients:

| Coating Comp. Number | Parts of Ethyl Cellulose Solution of Example 6 | Parts of a 70 per cent Toluene Solution of Resin D |
|---|---|---|
| 7A | 100 | 18 |
| 7B | 100 | 36 |
| 7C | [1] 100 | 14 |
| 7D | [1] 100 | 29 |

[1] The ethyl cellulose solution used in these two samples had the following composition:

| | Parts |
|---|---|
| Ethyl cellulose (46.8 percent to 48.5 percent ethoxyl content, 9.3 cps.) | 200 |
| Xylene | 640 |
| n-Butyl alcohol | 160 |

The above coating compositions were applied to glass plates with a 6-mil doctor blade and allowed to air-dry for about one-half hour. At the end of this time, the films were clear, hard, glossy and haze-free. Addition of plasticizers, e. g., dibutyl phthalate and tricresyl phosphate, to the above coating compositions produced clear, tough, haze-free films on the glass. The films deposited from coating compositions 7A, 7B, 7C, and 7D dried quite readily and were tack-free within 4–5 minutes after they were applied to the glass plate.

EXAMPLE 8

Coating compositions were prepared from the following ingredients:

Sample 8A

| | Parts |
|---|---|
| Toluidine red pigment paste | 250 |
| 70 per cent toluene solution of Resin D | 200 |
| Ethyl cellulose solution used in Example 6 (column 7) | 400 |

Sample 8A—Continued

| | Parts |
|---|---|
| Thinner¹ | 150 |

Sample 8B

| | Parts |
|---|---|
| Brown iron oxide pigment paste | 350 |
| 70 per cent toluene solution of Resin D | 200 |
| Ethyl cellulose solution used in Example 6 (column 7) | 400 |
| Thinner¹ | 50 |

Sample 8C

| | Parts |
|---|---|
| Chrome yellow pigment paste | 250 |
| 70 per cent toluene solution of Resin D | 200 |
| Ethyl cellulose solution used in Example 6 (column 7) | 480 |
| Thinner¹ | 70 |

¹ The thinner employed in these examples consisted of a mixture containing the following ingredients:

| | Parts |
|---|---|
| Xylene (industrial grade) | 440 |
| "Straight petroleum distillate," 80°–130° C. range | 310 |
| Ethyl alcohol | 150 |
| n-Butyl alcohol | 100 |

The above coating compositions were applied to glass panels with a 6-mil doctor blade and allowed to air-dry. The films obtained in each case were hard, opaque, smooth and glossy. When all the tetrachlorophthalic anhydride is replaced by phthalic anhydride in the preparation of the oil-modified alkyd resin, the pigments are introduced to a coating composition containing such a resin and ethyl cellulose, the films obtained in this case would be dull and flat.

EXAMPLE 9

An ethyl cellulose solution was prepared as follows:

| | Parts |
|---|---|
| Ethyl cellulose (43.5 to 44.5 per cent ethoxyl content, 93 cps.) | 100 |
| Toluene | 630 |
| Ethyl alcohol | 270 |

To 70 parts of the above ethyl cellulose solution was added 10 parts of a 70 per cent toluene solution of Resin D. This mixture was employed as a coating solution by applying some of the solution to a glass plate with a 6-mil doctor blade. After air drying for a short time, a clear, hard film was obtained.

Although the coating compositions of this invention are air-drying, acceleration of the drying may be obtained by subjecting the coated articles or surfaces to elevated temperatures of the order of about 50° to 100° C. or higher without danger of discoloration or decomposition of the film.

Modifications of the oil-modified alkyd resin are within the intended scope of this invention. For example, other resins such as natural resins, e. g., rosin, shellac, kauri, dammar; coumarone-indene resins; synthetic resins, e. g., phenolic resins, other alkyd resins, etc., and mixtures thereof may be admixed with the claimed coating compositions.

In preparing lacquers from the compositions disclosed above, various other suitable solvents or mixtures of suitable solvents may be employed which have not been disclosed in the foregoing examples. These include ketones, e. g., methyl cyclohexanone, methyl isobutyl ketone, mesityl oxide, methyl n-amyl ketone, diisobutyl ketone, etc.; esters, e. g., glycol diacetate, butyl lactate, etc.; other coal tar solvents, e. g., tetralin, benzene, etc.; higher alcohols such as butanol, benzyl alcohol, etc.; nitroparaffins, especially those containing from 1 to 5 carbon atoms, e. g., nitromethane, 1-nitropropane, 2-nitropropane, the nitrobutanes, the nitropentanes, etc.; chlorinated hydrocarbons, e. g., carbon tetrachloride, pentachlorethane, ethylene dichloride, etc.; hydrocarbon-substituted ethylene glycol ethers, e. g., ethyl ether of ethylene glycol, butyl ether of ethylene glycol, etc.

It is of course understood that the per cent, by weight, of the resinous materials (ethyl cellulose and the specific oil-modified alkyd resin) in the suitable solvent or mixture of solvents may be widely varied depending upon the particular use or application intended for the coating composition. Thus, for example, when two solutions are to be admixed, that is, the ethyl cellulose solution and the solution of the oil-modified alkyd resin, the concentration (solids content) of the mixture may advantageously be varied from about 5 per cent to as high as 60 to 80 per cent. For usual coating applications, the concentration of the solution may vary from about 10 per cent to 40 or 50 per cent. However, I do not intend to be limited to the foregoing percentages in the practice of my invention.

What I claim as new and desire to secure by Letters Patent of the United States is:

1. A liquid coating composition comprising a compatible and miscible solution containing (1) a mixture of resinous ingredients comprising, by weight, (a) from 5 to 95 per cent of a preformed modified tetrachlorophthalate alkyd resin comprising the product of reaction of a mixture containing coconut oil fatty acids, glycerine, and tetrachlorophthalic anhydride and (b) from 95 to 5 per cent ethyl cellulose having an ethoxyl content between 43.5 and 49.5 per cent, and (2) a solvent for (1), the mixture of resinous ingredients being present, by weight, in an amount equal to from 10 to 60 per cent of the total weight of (1) and (2).

2. A liquid coating composition comprising a compatible and miscible solution containing (1) a mixture of resinous ingredients comprising, by weight, (a) from 5 to 95 per cent of a preformed modified alkyd resin comprising the product of reaction of a mixture containing raw castor oil, glycerine, and tetrachlorophthalic anhydride and (b) from 95 to 5 per cent ethyl cellulose having an ethoxyl content between 43.5 and 49.5 per cent, and (2) a solvent for (1), the mixture of resinous ingredients being present, by weight, in an amount equal to from 10 to 60 per cent of the total weight of (1) and (2).

3. A liquid coating composition comprising a compatible and miscible solution containing (1) a mixture of ingredients comprising, by weight, (a) from 5 to 95 per cent of a preformed modified alkyd resin comprising the product of reaction of a mixture containing linseed oil, glycerine, and tetrachlorophthalic anhydride and (b) from 95 to 5 per cent ethyl cellulose having an ethoxyl content between 43.5 and 49.5 per cent, and (2) a solvent for (1), the mixture of resinous ingredients being present, by weight, in an amount equal to from 5 to 60 per cent of the total weight of (1) and (2).

4. A liquid coating composition comprising a compatible and miscible solution containing (1) a mixture of resinous ingredients comprising, by weight, (a) from 10 to 60 per cent of a preformed modified alkyd resin comprising the product of reaction of a mixture consisting essentially of castor oil, glycerine, tetrachlorophthalic anhydride and phthalic anhydride, the phthalic anhydride being present, by weight, in an amount equal to from 5 to 40 per cent of the weight of tetrachlorophthalic anhydride and (b) from 40 to 90 per cent ethyl cellulose having an ethoxyl content between 46.8 and 49.5 per cent, and (2) a solvent for (1), the mixture of resinous ingredients being present, by weight, in an amount equal to from 10 to 60 per cent of the total weight of (1) and (2).

5. A liquid coating composition comprising a compatible and miscible solution containing (1) a mixture of resinous ingredients comprising, by weight, (a) from 5 to 95 per cent of a preformed modified tetrachlorophthalate alkyd resin wherein the modifier of the alkyd resin is a member selected from the class consisting of non-drying oils, semi-drying oils, drying oils, fatty oil acids, and mixtures thereof, and (b) from 95 to 5 per cent ethyl cellulose having an ethoxyl content between 43.5 and 49.5 per cent, and (2) a solvent for (1), the mixture of resinous ingredients being present, by weight, in an amount equal to from 5 to 80 per cent of the total weight of (1) and (2).

6. A liquid coating composition capable of forming a clear film on drying and comprising a compatible and miscible solution containing (1) a mixture of resinous ingredients comprising, by weight, (a) from 5 to 95 per cent of a preformed modified alkyd resin comprising the product of reaction of a mixture containing a polyhydric alcohol, tetrachlorophthalic anhydride and an oily modifying substance selected from the class consisting of non-drying oils, semi-drying oils, drying oils, fatty oil acids, and mixtures thereof, and (b) from 95 to 5 per cent ethyl cellulose having an ethoxyl content between 43.5 and 49.5 per cent, and (2) a solvent for (1), the mixture of resinous ingredients comprising, by weight, from 10 to 60 per cent of the total weight of (1) and (2).

7. A clear liquid coating composition comprising a compatible and miscible solution containing (1) a mixture of resinous ingredients comprising, by weight, (a) from 5 to 95 per cent of a preformed modified alkyd resin comprising the product of reaction of a mixture containing a polyhydric alcohol, tetrachlorophthalic anhydride, phthalic anhydride, and an oily modifying ingredient, the phthalic anhydride being present, by weight, in an amount equal to from 2 to 50 per cent of the weight of the tetrachlorophthalic anhydride, and the oily modifying ingredient being a member selected from the class consisting of non-drying oils, semi-drying oils, drying oils, fatty oil acids, and mixtures thereof, and (b) from 95 to 5 per cent ethyl cellulose having an ethoxyl content between 43.5 and 49.5 per cent, and (2) a solvent for (1), the mixture of resinous ingredients being present, by weight, in an amount equal to from 10 to 60 per cent of the total weight of (1) and (2).

8. A liquid coating composition capable of forming a clear film on drying comprising a compatible and miscible solution containing (1) a mixture of resinous ingredients comprising, by weight, (a) from 5 to 95 per cent of a preformed modified alkyd resin comprising the product of reaction of a mixture containing a non-drying oil, glycerine, tetrachlorophthalic anhydride, and phthalic anhydride, the phthalic anhydride being present, by weight, in an amount equal to from 2 to 50 per cent of the weight of the tetrachlorophthalic anhydride and (b) from 95 to 5 per cent ethyl cellulose having an ethoxyl content between 43.5 and 49.5 per cent, and (2) a solvent for (1), the mixture of resinous ingredients being present, by weight, in an amount equal to from 10 to 60 per cent of the total weight of (1) and (2).

9. A coating composition capable of forming a hard, smooth, glossy film on drying, said composition comprising (1) a mixture of resinous ingredients comprising, by weight, (a) from 5 to 95 per cent of a preformed modified alkyd resin comprising the product of reaction of a mixture containing glycerine, tetrachlorophthalic anhydride and an oily modifying ingredient selected from the class consisting of non-drying oils, semi-drying oils, drying oils, fatty oil acids, and mixtures thereof, and (b) from 95 to 5 per cent ethyl cellulose having an ethoxyl content between 43.5 and 49.5 per cent, (2) a pigment, and (3) a solvent for (1), the mixture of resinous ingredients comprising from 10 to 60 per cent, by weight, of the total weight of (1) and (2).

10. The method for making a compatible and miscible coating composition which comprises (1) preparing a preformed modified tetrachlorophthalate alkyd resin by reacting a mixture of ingredients comprising a polyhydric alcohol, tetrachlorophthalic anhydride and a modifying substance selected from the class consisting of non-drying oils, semi-drying oils, drying oils, fatty oil acids, and mixtures thereof, (2) dissolving the said preformed alkyd resin in a solvent therefor, and (3) dissolving in the solution (2) from 5 to 95 per cent, by weight, ethyl cellulose having an ethoxyl content between 43.5 and 49.5 per cent, the weight of the resinous ingredients in the final coating composition being equal to from 5 to 80 per cent, by weight, of the total weight of the solvent and the mixture of resinous ingredients.

PHILIP W. HAM.

REFERENCES CITED

The following references are of record in the file of this patent:

UNITED STATES PATENTS

| Number | Name | Date |
|---|---|---|
| 1,975,246 | Zwilgmeyer | Oct. 2, 1934 |
| 2,022,011 | Sly | Nov. 26, 1935 |
| 2,389,708 | Zolad | Nov. 27, 1945 |